United States Patent

[11] 3,633,124

[72] Inventor Hans Guenter Danielmeyer
    Matawan, N.J.
[21] Appl. No. 45,193
[22] Filed June 10, 1970
[45] Patented Jan. 4, 1972
[73] Assignee Bell Telephone Laboratories, Incorporated
    Murray Hill, N.J.

[54] LASER WITH FEEDBACK CIRCUIT FOR CONTROLLING RELAXATION OSCILLATION
6 Claims, 4 Drawing Figs.

[52] U.S. Cl. .......................................... 331/94.5
[51] Int. Cl. ........................................... H01s 3/10
[50] Field of Search .............................. 331/94.5;
    350/160

[56] References Cited
UNITED STATES PATENTS
3,521,069  7/1970  DeMaria et al. ............. 331/94.5
3,496,485  2/1970  Gurs et al. .................. 331/94.5

Primary Examiner—William L. Sikes
Attorneys—R. J. Guenther and Arthur J. Torsiglieri ABSTRACT: There is disclosed an optically pumped solid-state laser with a dielectric crystal or glass host for the active medium. The pulse frequency, phase, height and width of relaxation oscillation pulsing are controlled by externally detecting the phase difference between a stable periodic perturbation of the pump light and the output pulse, then externally feeding back a signal to restore the laser output pulse phase to a fixed relationship to the phase of the perturbation. The perturbation can be provided by a small luminescent diode. Alternatively, the resonator loss can be modulated at the relaxation oscillation frequency by an acoustic cell in which the perturbations are scaled down by two or three orders of magnitude from those in an acoustic Q-switch. Moreover, relaxation oscillation pulsing of a single laser mode and frequency can be stimulated by employing the foregoing control technique and concurrently preventing spatial hole burning, specifically by varying the optical spacing between the ends of the laser rod and respective ones of the resonator mirrors simultaneously in inverse relationship.

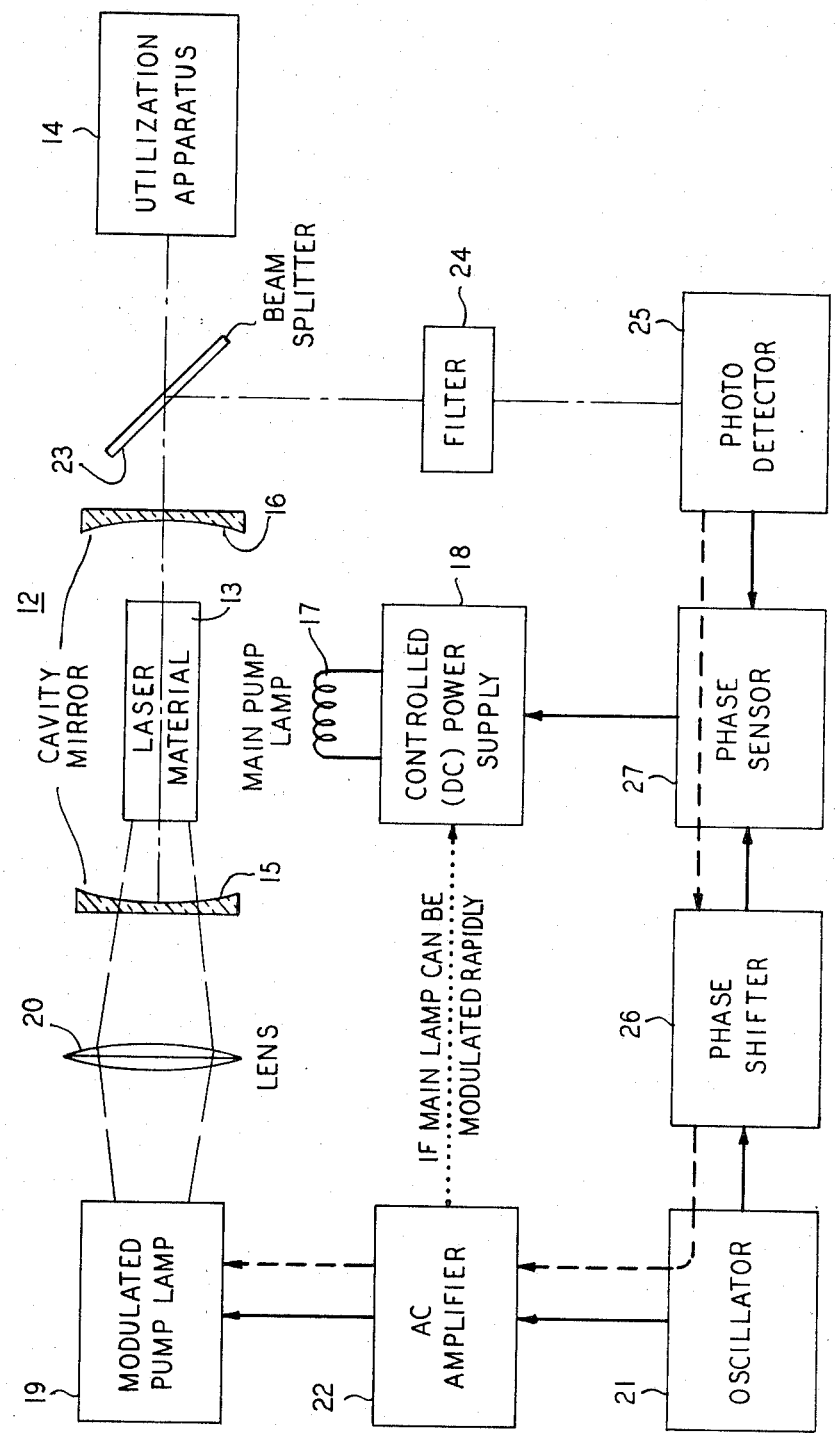

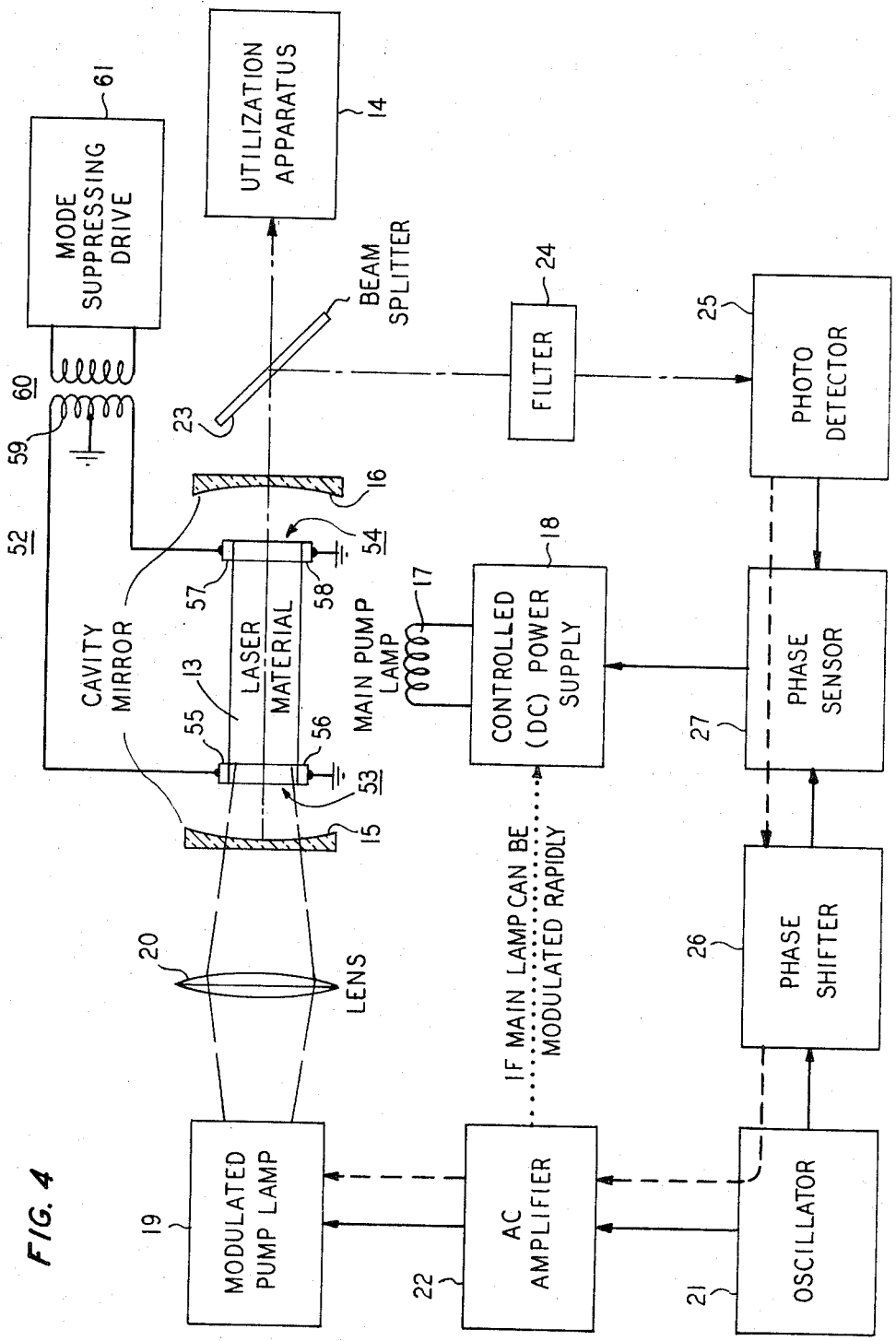

LASER WITH FEEDBACK CIRCUIT FOR CONTROLLING RELAXATION OSCILLATION

BACKGROUND OF THE INVENTION

This invention relates to techniques for controlling relaxation oscillations in lasers employing dielectric crystal or glass hosts for the active medium.

Relaxation oscillation in a solid-state laser is a type of oscillation that can appear in various ways, including a train of pulses having a repetition rate nearly equal to the relaxation oscillation frequency. These pulses are important for some applications because of the effective "memory" of the past history of the population inversion, which causes the pulses to be more regular in phase and amplitude than Q-switched pulses. Although relaxation oscillation pulses occur at a much lower repetition rate and have a similar peak power than would mode-locked pulses in a comparable solid-state laser, the former pulses nevertheless yield a substantially higher pulse energy, comparable only to the most rapid possible train of Q-switched pulses in a comparable laser. The combination of stable peak power, high total pulse energy, intermediate repetition rate, and phase regularity makes relaxation oscillation pulses desirable for applications such as optical memories and microwelding.

While various control techniques have been proposed for relaxation oscillation pulsing of semiconductor lasers, such as semiconductor injection lasers, these techniques are not directly applicable to control of relaxation oscillation pulsing in solid-state lasers employing dielectric or glass hosts for the active medium because of the differences in the fundamental physics of the two different types of solid-state lasers.

While some incidental control of relaxation oscillation in lasers employing dielectric crystal or glass hosts has occurred when the oscillations are perturbations superimposed upon controlled mode-locked pulsing of such lasers, the control of the relaxation oscillations was imprecise and unsophisticated because of the requirements of the control of the mode-locking and, in any event, did not yield the combination of desirable characteristics obtained when the pulse repetition rate is the relaxation oscillation frequency.

SUMMARY OF THE INVENTION

I have discovered that relaxation oscillation pulsing of a neodymium laser employing an yttrium aluminum garnet host can be stimulated and controlled by a modulation of the resonator loss which is two or three orders of magnitude smaller than Q-switching modulations or, alternatively, by a modulation of the pumping power which corresponds to the aforesaid small loss modulation. Peak intensities about 20 times the average laser power were observed in the controlled pulse train.

Advantageously, the regularity of these pulses in phase and amplitude is useful for optical memories and microwelding applications. The power compression is advantageous for second harmonic generation.

According to my invention, an optically pumped solid-state laser with a dielectric crystal or glass host employs an arrangement for controlling relaxation oscillation pulsing in which the difference between the phase of a stable periodic perturbation of the pump light or resonator loss and the phase of the output pulse train is externally detected and then fed back to change the DC component of the pump light to restore the laser output pulse phase to a fixed relationship to the phase of the perturbation. Specifically, the perturbation can be provided by a small semiconductor laser.

In another specific embodiment of the invention, relaxation oscillation pulsing of a single laser mode and frequency is similarly stimulated and controlled when single frequency operation is achieved by preventing spatial hole burning. The spatial hole burning is prevented by varying the optical spacing between the ends of the laser rod and respective ones of the reflectors of the resonator in inverse relationship to maintain a substantially constant optical length of the resonator.

BRIEF DESCRIPTION OF THE DRAWING

Further features and advantages of my invention will become apparent from the following detailed description, taken together with the drawing, in which:

FIG. 1 is a partially pictorial and partially block diagrammatic illustration of a first illustrative embodiment of my invention;

FIG. 4 shows a modification of the embodiment of FIG. 1 for obtaining controlled relaxation oscillation pulsing of a single laser mode and frequency.

Figure 3:
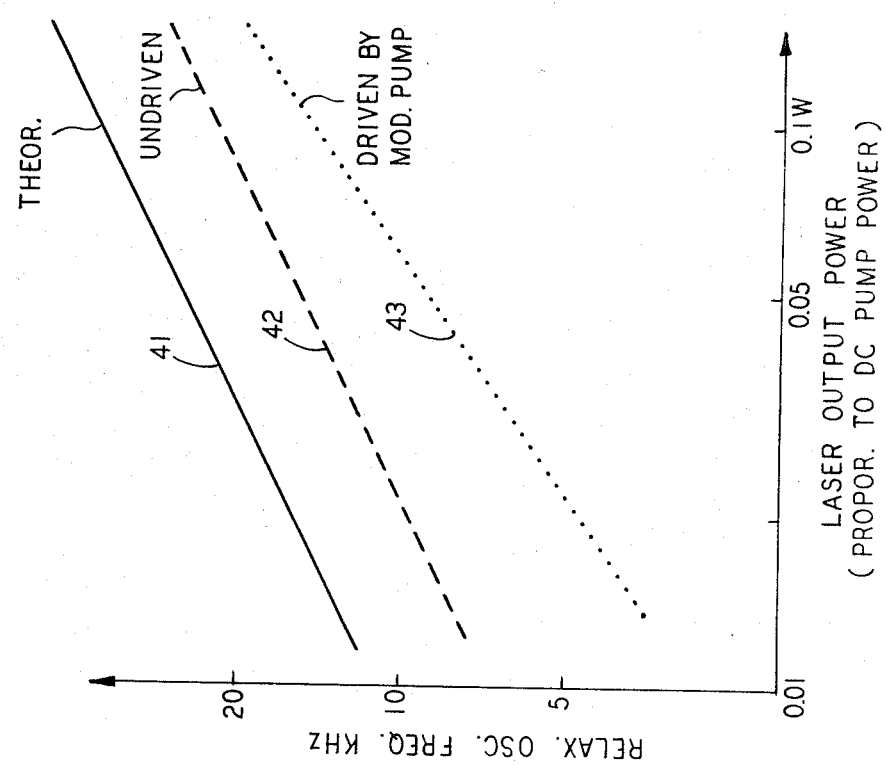
FIG. 3 shows curves pertinent to the control characteristic obtained by control of the pumping power level in FIG. 1.

In the embodiment of FIG. 1, it is desired to obtain a train of pulses in the range of frequencies characteristic of relaxation oscillation pulsing of a laser 12 having a crystal (or glass) host for the active medium 13, since pulses in such a frequency range are useful in a utilization apparatus 14, such as a microwelding apparatus, if the pulses are sufficiently regular in phase and amplitude.

The active medium 13 illustratively employs an yttrium aluminum garnet host containing neodymium as its constituent. The laser 12 also includes the opposed reflectors 15 and 16 forming the typical optical resonator of such a laser.

In this embodiment, both of the reflectors 15 and 16 are multiple-layer dielectric reflectors which are partially reflecting, but also transmissive to the order of a few percent.

The laser 12 is pumped by a principal pump lamp 17 excited by the controlled DC power supply 18. The power supply 18 is controllable partly because the pump lamp will deteriorate with time, thereby decreasing the average output power and also decreasing the frequency of relaxation oscillation pulsing. Nevertheless, regardless of the source of variation in the pulsing frequency, I have discovered that the power level from the pump lamp 17 is a superior parameter to vary and control the frequency (repetition rate) and other characteristics of the relation oscillation pulsing.

The frequency of relaxation oscillation pulsing can be calculated for a given power level of pump lamp 17. I have discovered that it is desirable to stimulate the pulsing at the relaxation oscillation frequency, for example, by the modulated pump lamp 19, the light from which is focused, for example, by lens 20 through the partially transmissive reflector 15 to provide additional pumping of the laser-active medium 13. The modulation frequency of the pump lamp 19, illustratively a luminescent diode operating at a wavelength of 0.81 micrometer, is set at a stable fixed frequency, as it is usually not desirable to vary this frequency. Rather, the frequency of relaxation oscillation pulsing will be stabilized to this frequency, as will also the phase of the relaxation oscillation pulsing be stabilized relative to the phase of the modulated pump lamp 19.

The frequency of modulated pump lamp 19 is determined by the stable crystal oscillator 21, of known type, illustratively operating at about 150 kHz.; and the output of oscillator 21 is amplified and coupled to pump lamp 19 by the buffering amplifier 22.

The external control circuit for stabilizing the relaxation oscillation pulsing to laser 12 includes the beam splitter 23 disposed obliquely in the path of the output light pulses to deflect a portion thereof to the filter 24 which eliminates any extraneous luminescence of the laser-active medium 13, illustratively by blocking or absorbing visible light frequencies. The filter 24 then couples the train of laser light pulses to the photodetector 25 which produces an output signal representative of the phase and amplitude of the light pulses at the relaxation oscillation frequency. Thus photodetector 25 is illustratively a photodiode capable of responding readily at 150 kHz.

The output of photodetector 25 is applied to one input of phase sensor 27. A portion of the output of oscillator 21 is appropriately shifted in phase by a phase shifter 26 to obtain a null at phase sensor 27 when the relaxation oscillations of laser 12 are at the calculated frequency. The output of phase shifter 26 is applied to the other input of phase sensor 27. The output of phase sensor 27 is applied to change the power level of the power supply 18 in the appropriate sense to restore a null at the output of phase sensor 27 as the laser 12 responds to the change in power level from the supply 18.

The theory of the operation of the embodiment of FIG. 1 can be explained as follows: The response of lasers to pump fluctuations has been analyzed theoretically by D. E. McCumber (Phys. Rev. 141, 306–22, 1966). An applied theoretical approach will be used here which includes phase relationships and other information necessary for applications. Using the rate equations readily derived and modulating the average effective pump power $$h\nu\beta = \pi w^2 I_s (1 + \tau/\tau_R)(L+T) \text{ with a factor } (1+\alpha) \text{ where}$$
$$\alpha = \hat{\alpha} e^{i\omega t}, \quad (1)$$

one obtains for the photon modulation
$$\phi = \hat{\phi} e^{i(\omega t + \epsilon)} \quad (2)$$

the solution
$$\hat{\phi} = 2aR\hat{\alpha}/\tau_Q [(\omega_o^2 - \omega^2)^2 + 4a^2\omega^2]^{1/2} \quad (3)$$
$$\epsilon = -\text{Arctan}[2a\omega/(\omega_o^2 - \omega^2)]. \quad (4)$$

It can be shown that equation (3) is a special case of McCumber's intensity fluctuation spectrum. For self-sufficiency, the symbols are explained here:

$\omega_o = (\tau_Q \tau_R)^{-1/2}$ circular relaxation oscillation frequency
$a = (\tau^{-1} + \tau_R^{-1})/2$ damping constant
$\tau$=fluorescent lifetime ($2.3 \cdot 10^{-4}$s)
$\tau_Q = 2L/c(L+T)$ cold cavity lifetime
$\tau_R = \pi w^2 I_s T\tau/P$ stimulated lifetime
$I_s$=saturation parameter (320 w./cm.$^2$)
P=average output power
T=output transmission (0.02)
L=laser losses other than output (0.01)
L=optical length of cavity (5.1cm.)
c=vacuum velocity of light
$w=1/e^2$ beam radius in rod (0.06 cm)
$R=2Pl/h\nu cT$ average photon number in cavity The modulation index obtained with a 100 mw. Nd:YAG laser by means of a pump modulation index of $\hat{\alpha}=10^{-3}$ is plotted in curve 31 of FIG. 2. The full held width of the relaxation oscillation peak is $2\sqrt{3}a=19$ kHz. at a relaxation oscillation frequency $\omega_o/2\pi = 150$kHz. The drastic phase change at resonance, as shown in curve 32 of FIG. 2, can be used to control the operation. Defining an amplification factor $\hat{S} = \hat{\phi}/R\hat{\alpha}$, the ratio of output modulation index $\phi/P = \hat{\phi}/R$ to pump modulation index $\hat{\alpha}$, one obtains for $\omega = \omega_o$, i.e., modulation at the relaxation oscillation frequency, $\hat{S} = (\tau_R/\tau_Q)^{1/2}$, and $\epsilon = \pi/2$. This is the maximum response of the laser to pump modulation. For the Nd:YAG laser above, $\hat{S}=100$. Thus, only a very small pump modulation is needed to obtain a sizable output modulation. With loss modulation output pulses were observed with peak powers 20 times the average laser power, and the linear theory predicted the peak intensity still reasonably well. It is therefore, expected that a pump modulation will yield pulses with a peak intensity
$$\hat{P} = \hat{\alpha}\hat{S}P \quad (5)$$

and a pulse length of
$$\tau_P = 2\pi/\hat{\alpha}\hat{S}\omega_o \quad (6)$$

for $\hat{\alpha}\hat{S}$ values up to 100, approximately. It was experimentally verified for the case of cavity loss modulation, that $\hat{P}\omega_P$ is constant, i.e., no power is lost in the process.

Assume that the frequency of relaxation oscillation pulsing has changed, for whatever reason. We notice that in the embodiment of FIG. 1 the modulation frequency provided by modulated pump lamp 19 is fixed frequency, which by itself would be inadequate to overcome the deviation in the frequency of the laser pulsing.

Nevertheless, a quantity very sensitive to any difference between these frequencies is the phase between the output train of pulses and the pump modulation waveform from lamps 19, whether or not that modulation is pulsed in form of sinusoidal in form. This phase difference also preserves the sign of the difference in phase, as provided at the output of phase sensor 27. Since the foregoing theoretical analysis has shown the relationship between the DC pump power from supply 18 and the frequency of relaxation oscillation pulsing, it is apparent that the appropriate application of the output of phase sensor 27 can regulate the pump power from supply 18 to maintain the frequency of pulsing substantially constant with respect to time.

My analysis also shows that it is possible to use self-stabilization for relaxation oscillation pulsing in laser 12 by monitoring the output of phase sensor 27 even when the stimulating perturbation has been supplied by an acoustic cell in the resonator of laser 12 instead of by pump lamp 19, and then feeding the output of phase sensor 27 to correct the phase of the intracavity modulation. Nevertheless, it would still be preferably to vary the average pumping power level, because nothing has to be inserted into the laser cavity and, accordingly, avoid losses.

EXAMPLE

In the illustrative embodiment of FIG. 1, the following specific characteristics of operation are obtainable.

Using a pump modulation index of $\hat{\alpha}=0.1$ and the above Nd:YAG laser with only 100 milliwatts average laser power, one should obtain relaxation oscillation pulses of 600 nanoseconds width, 1 w. peak power, and 6 microseconds (150 kHz. repetition rate. In a static experiment it was found that an input power of 100±10 w. above threshold (700 w.) into a tungsten-iodine lamp 17 yielded an output power of 100±10mw. If the same experiment could be performed at 150kHz., one would pick up the factor $\hat{S}$ and obtain controlled relaxation oscillation pulsing with 1 w. peak power. Some arc lamps and laser diodes can be modulated at these frequencies. A Krypton arc lamp has a somewhat higher efficiency than a tungsten-iodine lamp (only 0.05 percent overall). It is reasonably to assume, therefore, that a 1 w. Krypton arc lamp will produce controlled relaxation oscillation pulses with 1 w. peak power in the 100 mw. Nd:YAG laser. A GaAs diode is much more efficient. It is sufficient to apply the pump power equivalent to the 10 mw. output change of the static experiment dynamically. This could be achieved in lamp 19 with a GaAs diode of about 20 mw. average light output power.

The controlled pulsing of my invention is of interest in the following cases:

1. Where power compression is desirable (second harmonic generation, optical memories, microwelding).
2. Where the repetition rate of the pulses is irrelevant or matches a desired rate. In the Nd:YAG laser example, the access-time requirements of optical memories are approached. The short pulse lengths allow enough time for positioning of the laser beam on the hologram. (The positioning has to be timed with the pulses.) The access time can be reduced by increasing the cw. laser power. The peak intensity can be increased by increasing the laser power and/or the modulation index. 3. Whether the energy per pulse must be much larger than the energies obtainable with mode-locking 4. Where the phases and amplitudes of the pulses must be well controlled.

Figure 2:
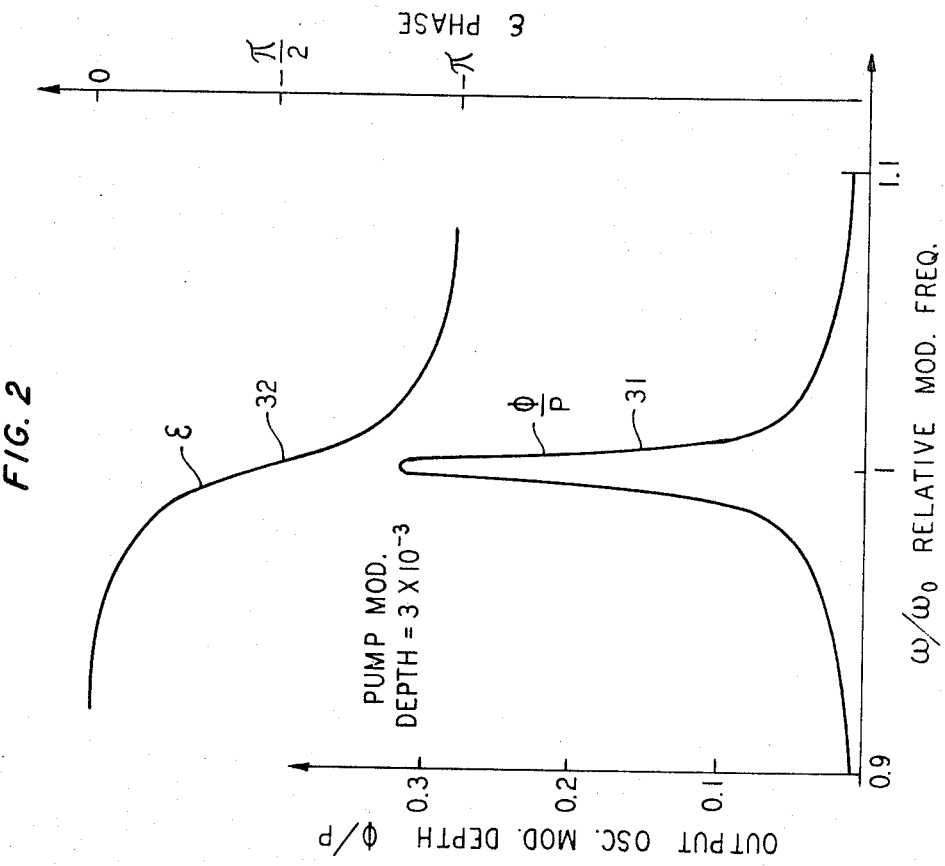
FIG. 2 shows curves helpful in explaining the operation of the embodiment of FIG. 1.

In FIG. 2 there is shown a curve 31 of the output modulation depth $\phi/P$ and a curve 32 of the relative phase $\epsilon$ of the relaxation oscillation pulses as a function of the frequency $\omega$ of the pulses divided by the relaxation oscillation frequency $\omega_o$. The scale of $\phi/P$ is in terms of the ratio of the peak pulse height to the average laser power. The particular curve 31 is applicable only for a pump modulation depth of $3\times10^{-3}$; that is, modulated pump lamp 19 provides a peak power which is 1/330 of the power supplied by the pump lamp 17. Assuming that the output of phase shifter 26 is held constant, the relative phase $\epsilon$ of the output of photodetector 25 is shifted by $-\pi/2$ with respect thereto.

The typical variation in the frequency of relaxation oscillation pulsing in the illustrative embodiment of FIG. 1 is shown in FIG. 3 in terms of the variation in laser output power at beam splitter 23. This laser output power is directly proportional to the DC pump power supplied by the controlled power supply 18. The curve 41 is a curve calculated on the basis of the foregoing theory. The curve 42 may be termed the undriven experimental curve, as it was derived by varying the pump power from source 18 and measuring the laser output power and relaxation oscillation frequencies in the absence of any pump light from pump lamp 19. The curve 43 may be termed the driven experimental curve, as it was obtained by modulating the cavity loss at the frequency given on the realization oscillation frequency scale.

In the modified embodiment of FIG. 4, components numbered the same as in FIG. 1 are substantially similar thereto. The principal difference is a modification of the laser itself, here designated laser 52, to provide operation in a single laser mode and frequency near the center of the 1.06 micrometer neodymium laser line. This modification includes the electro-optic modulators 53 and 54 at either end of the laser active medium 13. The modulators 53 and 54, respectively, include the electrodes 55 and 56, 57 and 58 connected across respective halves of the output winding 59 of transformer 60 driven by a suitable electrical source 61, here termed the mode-suppressing drive.

The modulators 53 and 54 are thus driven sinusoidally 180° out of phase to provide equal and opposite variations in optical path length between the respective ends of active medium 13 and reflectors 15 and 16. When drive 61 produces in modulators 53 and 54 a phase change equivalent to the motion of medium 13 axially at a rate of about 1 cm. per second, the laser commences to operate in a single mode and frequency because the population inversion within the medium 13 is equally utilized at every axial point along that medium. Thus, there is no spatial hole burning. The frequency of drive 61 is preferentially higher than $(1/\tau + 1/\tau_R)/2\pi$.

While this technique of producing oscillation in a single mode and frequency is known, the modified embodiment of FIG. 4 is novel in the respect that it provides for the first time controlled relaxation oscillation pulsing of a single mode and frequency, I have demonstrated the possibility of this operation experimentally using cavity loss modulation. It is thereby shown that operation of the laser in multiple modes is not necessary to obtaining the train of output pulses which are regular in phase and amplitude.

I5 both FIG. 1 and FIG. 4, the modulated pump lamp 19 may be eliminated if the power supply 18 is capable of similar pump modulation by driving lamp 17 at a frequency of the desired relaxation oscillation pulsing. This face is representatively shown by the dotted arrow between AC amplifier 22 and power supply 18.

The dashed arrows coupling photodetector 25 to phase shifter 26 and thence through amplifier 22 to modulated pump lamp 19 show the frequency-pulling technique of external feedback control which could be used to supplement the technique of my invention, but which by itself would not be useful for stabilization of frequency and phase of the relaxation oscillation pulses, as well as their pulse height and pulse width. Employment of frequency pulling, that is, variation of the modulation frequency of lamp 19, would change the pulse height and average laser power in contrast to the principal technique of my invention.

I claim

1. A laser comprising a solid-state active medium, means for optically pumping said active medium to produce a population inversion suitable for the stimulated emission of radiation, means for resonating said radiation, said medium and said pumping and resonating means together yielding a selected frequency of relaxation pulsing for said laser and including a source of a periodic perturbation at said selected frequency, and means for stabilizing the phase of said relaxation oscillation pulsing to the phase of said perturbation comprising an external feedback circuit including means for detecting a phase difference of said pulsing and said perturbation, and means responsive to said detecting means for changing the total optical pumping power to reduce said phase difference.

2. A laser according to claim 1 in which the source of the periodic perturbation includes auxiliary optical pumping means disposed to illuminate the active medium and means for driving said auxiliary pumping means at the selected frequency.

3. A laser according to claim 2 in which the solid-state active medium comprises a dielectric host and active atoms therein, and the means for changing the total optical pumping power comprises a variable power supply coupled to the first-said optical pumping means and varied by the means for detecting the phase difference.

4. A laser according to claim 3 in which the auxiliary optical pumping means comprises a semiconductor luminescent diode.

5. A laser according to claim 3 in which the auxiliary optical pumping means provides at the active medium an optical perturbation, the peak intensity of which is two to three orders of magnitude smaller than the total optical pumping power.

6. A laser according to claim 1 in which the resonating means includes means for varying the optical position of said active medium within said resonating means at a rate to prevent spatial hole burning in said active medium, whereby said relaxation oscillation pulsing occurs in a single mode and frequency of the stimulated radiation.

* * * * *